April 14, 1953 O. L. JONES 2,634,853
WASTE BANK LEVELER

Filed Nov. 29, 1948 3 Sheets-Sheet 1

Inventor
Oliver L. Jones

By Patrick D. Beavers
Attorney

April 14, 1953  O. L. JONES  2,634,853
WASTE BANK LEVELER

Filed Nov. 29, 1948  3 Sheets-Sheet 2

Inventor
Oliver L. Jones
By Patrick D. Beavers
Attorney

April 14, 1953
O. L. JONES
2,634,853
WASTE BANK LEVELER
Filed Nov. 29, 1948
3 Sheets-Sheet 3
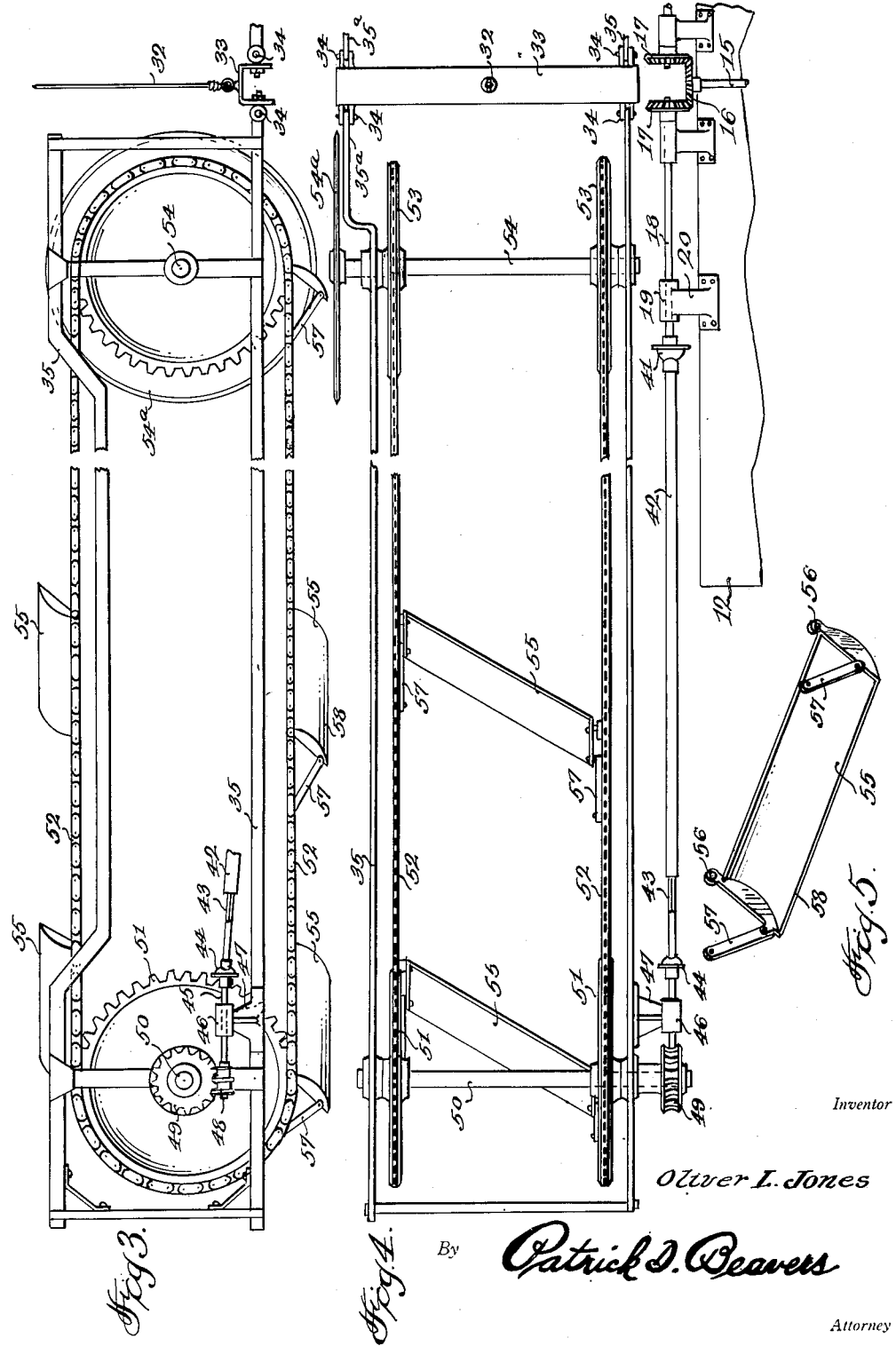
Inventor
Oliver L. Jones
By Patrick D. Beavers
Attorney Patented Apr. 14, 1953

2,634,853

UNITED STATES PATENT OFFICE 2,634,853

WASTE BANK LEVELER

Oliver L. Jones, La Crosse, Kans.

Application November 29, 1948, Serial No. 62,440

1 Claim. (Cl. 198—36)

The present invention relates to waste bank leveler and it consists in the combinations, constructions and arrangements of parts herein described and claimed.

It is an object of the present invention to provide a waste bank leveler which is adapted to be mounted upon the platform of a truck whereby the same may be supported from place to place.

Another object of the invention is the provision of a waste bank leveler having a pair of coacting endless conveyor-type scraping mechanisms.

Another object of the invention is the provision of novel means for positioning the scraping mechanisms.

A further object of the invention is the provision of novel means for the transfer of power to the scraping mechanisms from a motor forming a part of the invention.

Other and further objects of the invention will become apparent from a reading of the following specification taken in conjunction with the drawings, in which:

Figure 3 is a fragmentary elevational view of a scraping mechanism forming a part of the invention, Figure 4 is a plan view of Figure 3, and Figure 5 is a perspective view of a scraper bucket forming a part of the invention.

Figure 1:
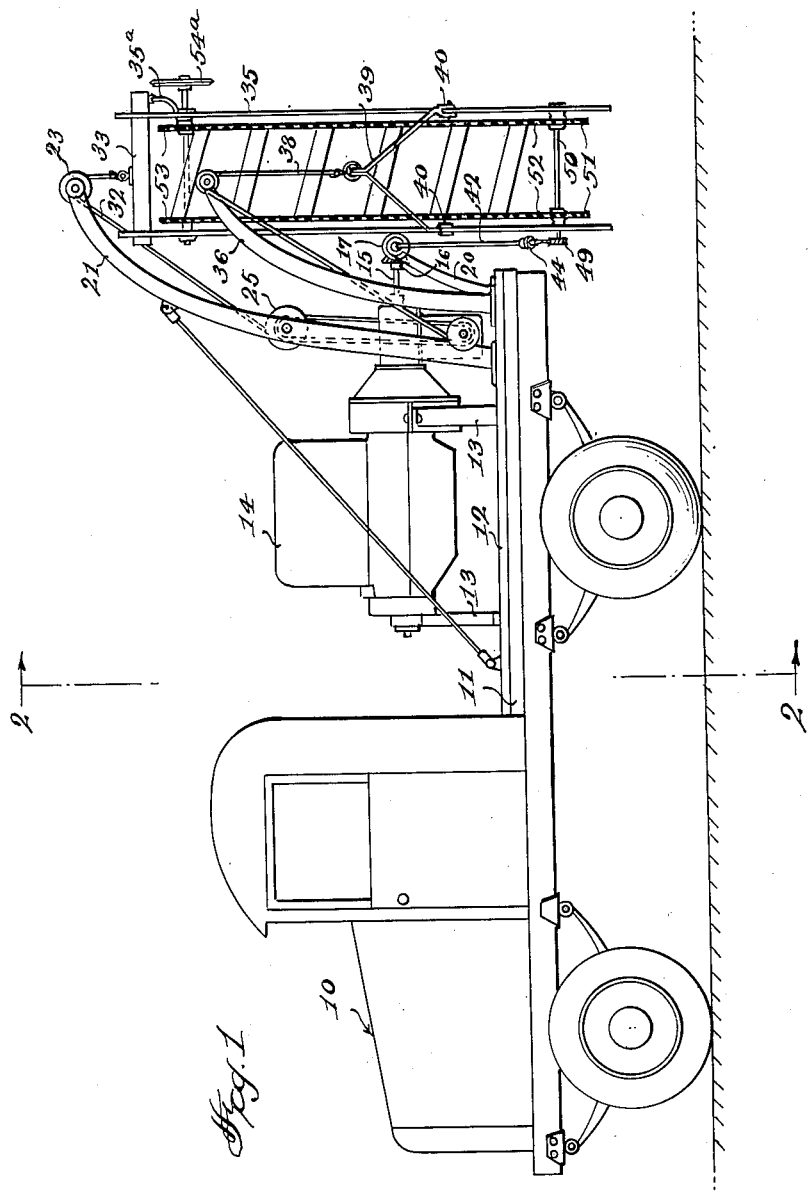
Figure 1 is a side elevational view of an embodiment of the invention.
Figure 2:
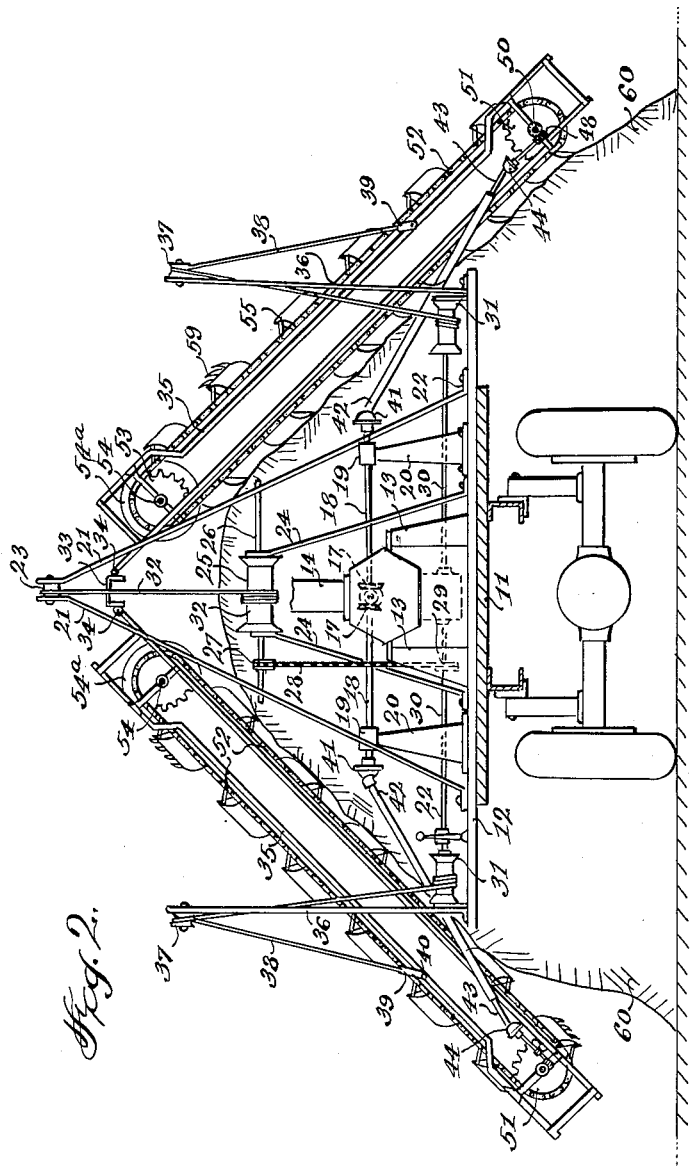
Figure 2 is a sectional view taken along line 2—2 of Figure 1.

Generally there is provided a waste bank leveling mechanism which is mounted upon the platform of a conventional truck and which consists essentially of a motor bolted to the platform, a plurality of masts and a pair of downwardly and outwardly disposed endless conveyor-type scraping mechanisms comprising chains to which are affixed a plurality of angularly disposed scraper buckets. Power is supplied to each of the scraper assemblies from the motor through shafts provided with universal joints and telescoping sections. The angle of each of the scraper assemblies may be changed through an arrangement of cable connections thereto which cables are given motive power from a motor mounted upon the platform.

Referring more particularly to the drawings, there is shown therein a conventional truck 10 having a platform 11 to which is affixed an outwardly extending base member 12. Upon the base member there is permanently mounted, by means of brackets 13, a motor 14 which is provided with a rearwardly extending shaft 15 having a bevel gear 16 at its outer end.

The gear 16 is enmeshed with a pair of bevel gears 17 each affixed to a transversely extending shaft 18 journaled, as indicated at 19, in the upper end of an upright member 20 affixed at either side of the base 12.

A mainmast is provided and consists of a pair of legs 21 having feet 22 bolted adjacent either side of the case 12. The legs 21 converge at their upper ends and have mounted therebetween a pulley 23.

Between the legs 21 there is provided a pair of converging frame members 24 having mounted therebetween at their upper ends a revoluble spool 25 having an outwardly extending shaft 26 to which a sprocket 27 is affixed and which sprocket is interconnected by means of a chain 28 to a sprocket 29 affixed to a transversely extending shaft 30 which is moved by the motor 14 and which is provided at its outer ends with spools 31.

The spool 25 has affixed thereto and wound thereon a cable 32 which is trained over the pulley 23 and which has its outer end attached to a beam 33 to the opposite sides of which is hinged, as indicated at 34, a pair of downwardly and outwardly extending frames 35, each provided with an offset portion 35a.

Adjacent each of the sides of the base member 12 is affixed a sub-mast 36 having a pulley 37 revolubly mounted at its upper end. Each of the spools 31 has affixed thereto and wound thereon a cable 38 which extends upwardly and over its respective pulley 37 and thence downwardly to a yoke 39 which is pivotally connected to its respective frame 35, as indicated at 40.

The outer ends of the shafts 18 are each provided with a universal joint 41 which connects with a hollow shaft 42 in which, in each case is telescopically keyed a shaft 43 which is, in turn, provided with a universal joint 44 which connects with a shaft 45 extending through a journal 46 carried by a bracket 47 affixed adjacent the outer end of the frame 35.

The shaft 45 is provided with a worm gear 48 which is enmeshed with a worm wheel 49 affixed to a shaft 50 which extends transversely of the frame 35.

The shaft 50 has mounted thereon a pair of sprockets 51 which are interconnected by means of chains 52 with like sprockets 53 affixed to a shaft 54 revolubly mounted in the upper and inner end of the frame 35. Each shaft 54 extends beyond its respective offset portion 35a and has mounted at its outer end a circular cutting disc 54a.

At spaced intervals there is provided angularly and transversely disposed scraper buckets 55 which are provided with ears 56 at their inner ends and with links 57 adjacent their forward ends. The links and the ears are connected to the chains 52 whereby the outer or cutting edges 58 of the buckets are held at a distance from the plane in which the chains 52 move.

Two of the buckets 55 are provided with scarifying teeth 59 and the buckets so provided are spaced at a maximum distance from each other on the chain 52.

In operation, it will be seen that the truck 10 may be driven in conventional manner to proximity to a waste bank 60 to be levelled and then backed into position, after which the motor 14 is started and the truck moved backwardly until the buckets 55 come into contact with the bank 60. The scarifiers 59 will tend to loosen the earth composing the bank and the buckets will thereupon remove the same as well as any material already in a loose condition.

It will be noted that the pull upon the buckets is exerted in a downward direction and that, hence, there is no tendency for the endless chains 52 to buckle during the working of the apparatus. It will also be apparent that the outer ends of the endless chains assemblies may be raised and lowered through the motor 14 operating through the shafts 30, drums 31, cables 38 and yokes 39, suitable controls being provided for such apparatus. Again, the beam 33 may be raised and lowered through the cable 32 and drum 25, shaft 26, chain 28 and motor 14 whereby the upper ends of the frames 35 may be raised and lowered. Thus, as the bank 60 is eaten away by the operation of the apparatus forming this invention, the truck 10 may be moved from time to time to again bring the same into contact therewith and the working angles of the frames 35 may be changed at the will of the operator.

While but one form of the invention has been shown and described herein, it will be readily apparent to those skilled in the art that many minor modifications thereof may be made without departing from the spirit of the invention or the scope of the appended claim.

What is claimed is:

A scraper assembly comprising a frame, a pair of spaced parallel endless chains mounted for conventional movement in said frame, and a plurality of spaced scraper buckets transversely and angularly interconnecting said chains, said buckets each comprising an elongated body of arcuate cross section, end walls for said body extending parallel and adjacent to said chains, an ear formed at the rear end of each of said end walls and connected to the adjacent chain, and a link interconnecting the forward end of each end wall to the adjacent chain.

OLIVER L. JONES

References Cited in the file of this patent

UNITED STATES PATENTS

| Number | Name | Date |
| --- | --- | --- |
| Re. 4,947 | Ball | June 18, 1872 |
| 549,730 | Lane | Nov. 12, 1895 |
| 1,172,579 | Bunnell | Feb. 22, 1916 |
| 1,580,637 | Benbow | Apr. 13, 1926 |
| 2,000,072 | Gedstad | May 7, 1935 |
| 2,248,709 | Jarmin | July 8, 1941 |
| 2,274,970 | Tiffany | Mar. 3, 1942 |

FOREIGN PATENTS

| Number | Country | Date |
| --- | --- | --- |
| 405,045 | Great Britain | Feb. 1, 1934 |